United States Patent [19]

McMurtry et al.

[11] Patent Number: 5,152,072
[45] Date of Patent: Oct. 6, 1992

[54] SURFACE-SENSING DEVICE

[75] Inventors: David R. McMurtry, Wotton-Under-Edge; David G. Powley, Alveston, both of United Kingdom

[73] Assignee: Renishaw plc, Gloucestershire, United Kingdom

[21] Appl. No.: 745,850

[22] Filed: Aug. 16, 1991

Related U.S. Application Data

[63] Continuation of Ser. No. 424,245, Oct. 16, 1989, Pat. No. 5,040,306.

[30] Foreign Application Priority Data

Feb. 18, 1988 [GB] United Kingdom ............... 8803847

[51] Int. Cl.$^5$ ............................................. G01B 7/28
[52] U.S. Cl. ............................................. 33/558; 33/503; 33/DIG. 13
[58] Field of Search ................. 33/503, 504, 556, 558, 33/559, 561, 832, 1 M, 1 PT

[56] References Cited

U.S. PATENT DOCUMENTS

| | | | |
|---|---|---|---|
| 2,627,119 | 2/1953 | Graham | 33/558 |
| 2,867,043 | 1/1959 | Jarret et al. | 33/558 |
| 3,531,868 | 10/1970 | Stevenson . | |
| 3,727,119 | 4/1973 | Stanley et al. . | |
| 3,750,295 | 8/1973 | Nordmann . | |
| 3,771,230 | 11/1973 | Sartorio . | |
| 3,805,393 | 4/1974 | Lemelson . | |
| 3,824,893 | 7/1974 | Sartorio . | |
| 3,869,799 | 3/1975 | Neuer et al. . | |
| 4,060,906 | 12/1977 | Heizmann | 33/DIG. 13 |
| 4,084,323 | 4/1978 | McMurtry . | |
| 4,153,998 | 5/1979 | McMurtry . | |
| 4,158,919 | 6/1979 | McMurtry . | |
| 4,164,694 | 8/1979 | Amsbury et al. . | |
| 4,187,614 | 2/1980 | Abiru . | |
| 4,384,332 | 5/1983 | McMurtry . | |
| 4,384,407 | 5/1983 | Miyamoto . | |
| 4,477,973 | 10/1984 | Davies . | |
| 4,542,467 | 9/1985 | McMurtry . | |
| 4,611,403 | 9/1986 | Morita et al. . | |
| 4,636,960 | 1/1987 | McMurtry . | |
| 4,703,443 | 11/1987 | Moriyasu . | |
| 4,769,763 | 9/1988 | Trieb et al. . | |
| 4,835,718 | 5/1989 | Breyer et al. . | |
| 4,888,877 | 12/1989 | Enderle et al. . | |
| 4,901,256 | 2/1990 | McMurtry et al. . | |

FOREIGN PATENT DOCUMENTS

| | | |
|---|---|---|
| WO88/02843 | 4/1988 | European Pat. Off. . |
| 0317967 | 11/1988 | European Pat. Off. . |
| 1638048 | 3/1971 | Fed. Rep. of Germany . |
| 3309122 | 9/1984 | Fed. Rep. of Germany . |
| 3406045 | 8/1985 | Fed. Rep. of Germany . |
| 2298084 | 8/1976 | France . |
| 0033301 | 2/1982 | Japan ............... 33/DIG. 13 |
| 58-205801 | 11/1983 | Japan . |
| 60-140110 | 7/1985 | Japan . |
| 1123344 | 8/1968 | United Kingdom . |
| 2004656 | 4/1979 | United Kingdom . |
| 2037436 | 7/1980 | United Kingdom . |
| 2094478 | 9/1982 | United Kingdom . |
| 2136573 | 9/1984 | United Kingdom . |
| 2139357 | 11/1984 | United Kingdom . |
| 2167559 | 5/1986 | United Kingdom . |
| 2144860 | 1/1987 | United Kingdom . |
| 2203837 | 10/1988 | United Kingdom . |

*Primary Examiner*—Harry N. Haroian
*Attorney, Agent, or Firm*—Oliff & Berridge

[57] ABSTRACT

The disclosure pertains to a probe head (PH) for use in coordinate measuring machines and having a stylus (10) supported for axial displacement (D1) and angular displacements (D2,D3). A transducer (T1) senses axial forces (F1) on the sensing end (11) of the stylus due to engagement thereof with a workpiece 12. A strain gauge system (16) provided on the stylus senses transverse forces (F2) on the sensing end (11) of the stylus. The forces (F1,F2) are used to determine the orientation of the surface (12A) of the workpiece and a control system is described which responds to those forces to maintain the stylus normal to said surface (12A) during a scanning operation.

5 Claims, 5 Drawing Sheets

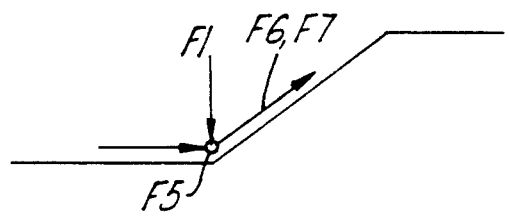
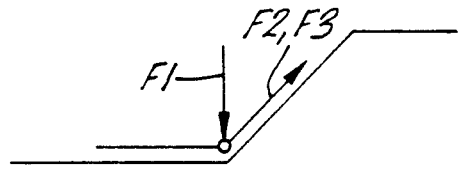
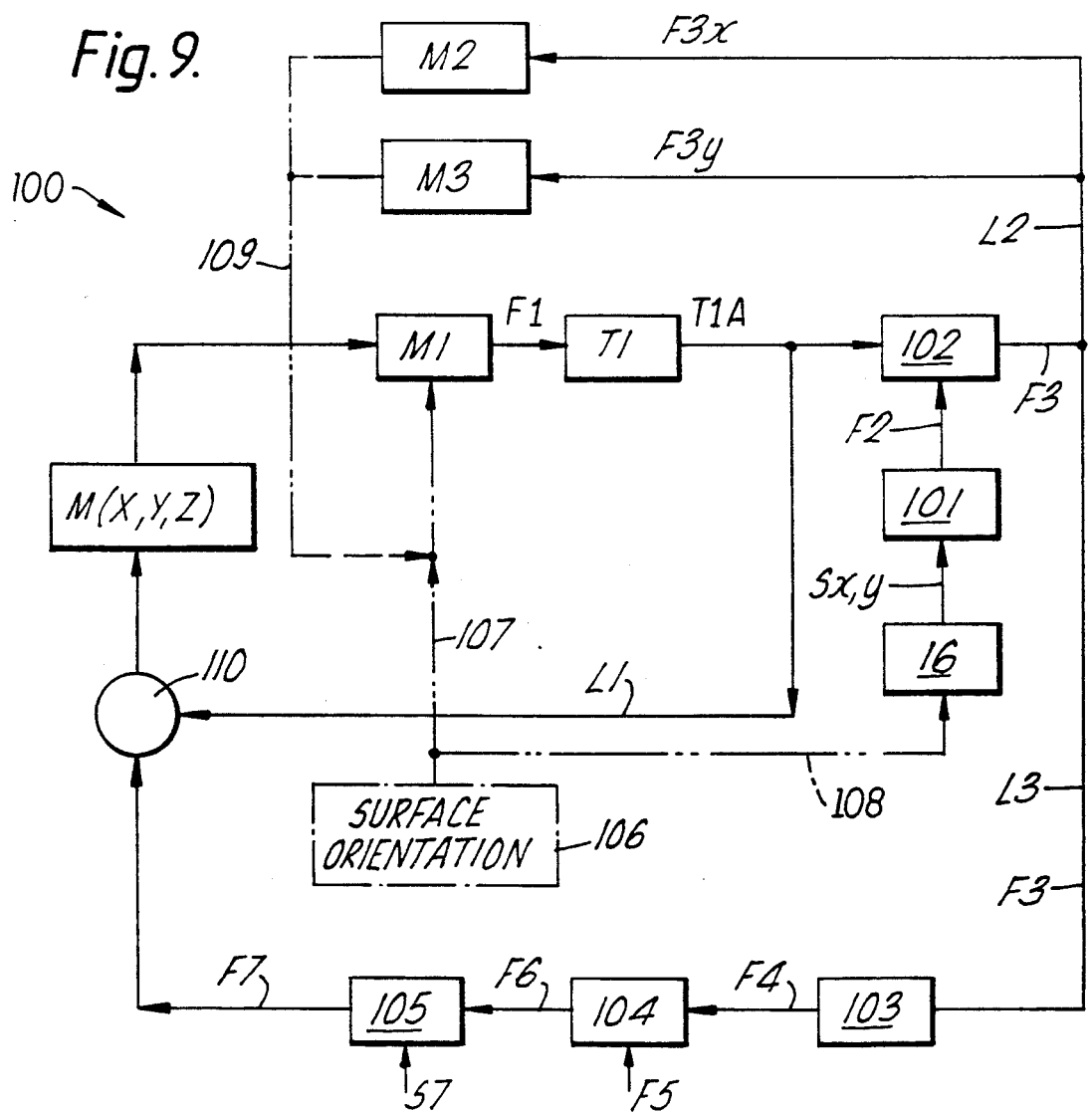

SURFACE-SENSING DEVICE

This is a continuation of application Ser. No. 07/424,245 filed Oct. 16, 1989, U.S. Pat. No. 5,040,306.

BACKGROUND OF THE INVENTION

1. Field of the Invention

This invention relates to a surface-sensing device for use in position-determining apparatus such as, for example, a coordinate measuring machine or machine tool.

Such a machine is used for measuring a workpiece, and typically comprises a head movable in three directions, x, y, and z, relative to a table on which the workpiece is supported. Movement of the head in each of the directions relative to a datum provided on the table is measured by scales on the machine, and a probe provided on the head emits a signal indicting the relationship between the workpiece surface to be measured and the head. The position of the surface may thus be determined.

It is sometimes desirable to obtain continuous data on the position of a surface, i.e., to scan the profile of a surface with the machine rather than simply obtain data in the form of one or more discrete points.

2. Description of Related Art

To achieve this, a measuring probe is provided on the head. The probe supports a stylus for movement relative to the head, and measures the magnitude of the stylus movement relative to the head in the x, y, and z directions. The head may therefore move adjacent the surface to be scanned while the stylus is in contact with the surface, and the surface profile may thus be determined. An example of such a probe is shown in U.S. Pat. No. 3,869,799.

SUMMARY OF THE INVENTION

The invention provides a support structure for an elongate surface-sensing stylus having a sensing element for engaging a surface at a free end, the support structure comprising:

a housing having an axis;

a pair of planar springs provided within the housing for supporting the stylus, each spring extending in a plane transverse to said axis and the springs being spaced apart along said axis; wherein the stylus is directly connected to each of the springs thereby to support the stylus in said housing, and wherein the stylus extends substantially parallel to said axis, the free end of the stylus projecting out of the housing thereby to enable the sensing element to engage a surface.

BRIEF DESCRIPTION OF THE DRAWINGS

An example of apparatus according to this invention will now be described with reference to the accompanying drawings wherein:

FIG. 7 is a section on the line VII—VII in FIG. 6.

FIG. 8 is a section on the line VIII—VIII in FIG. 6.

FIG. 9 is a diagram of a control system for controlling the machine and probe head for the purpose of a scanning operation.

DESCRIPTION OF THE PREFERRED EMBODIMENT

Figure 1:
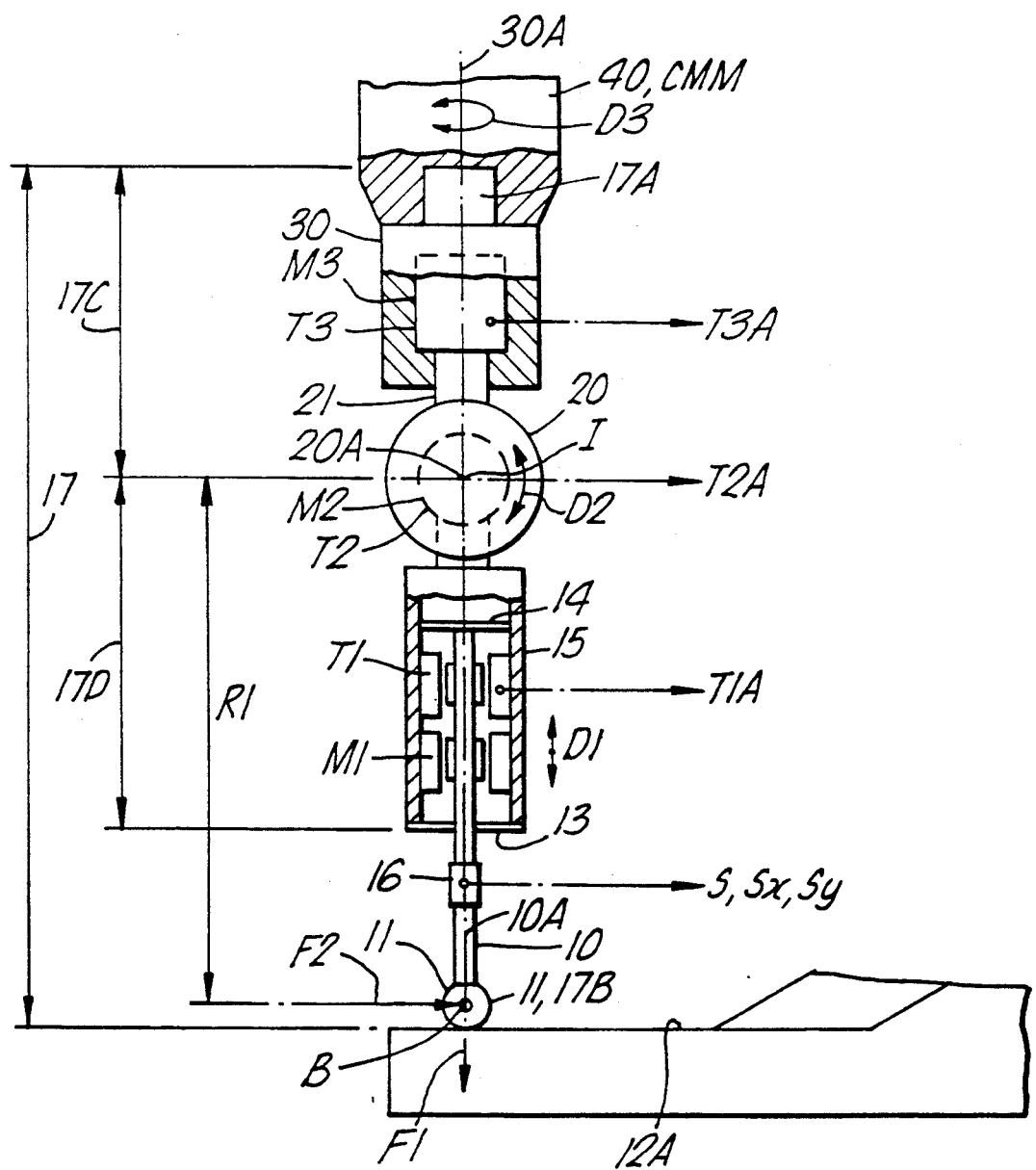
FIG. 1 is a partly sectioned elevation of a probe head.

Referring to FIG. 1, an elongate stylus 10 extending along an axis 10A has a spherical sensing element 11 whereby to engage a surface 12A of workpiece 12 whose contour is to be determined. Two planar springs 13,14, secured between a housing 15 and the stylus 10 support the stylus for linear displacement over a distance D1 relative to the housing 15 in the direction of the axis 10A. A motor M1 arranged between the housing 15 and the stylus 10 is adapted for applying a force F1 to the stylus in the direction of the axis 10A and a transducer T1 is provided for sensing the axial position of the stylus relative to the housing 15. The motor M1 is an electromagnetic positioning device urging the stylus in a sense away from the housing 15. A strain gauge system 16 provided on the stylus 10 is adapted for sensing any force F2 on the element 11 in a direction transverse to the axis 10A. The forces F1,F2 are assumed to act through a point B being the centre of the spherical element 11. The output of the system 16 is denoted S and is the resultant of components Sx,Sy (or Sx,y) which are respectively perpendicular and parallel to the axis 20A.

The housing 15 is supported on a housing 20 by a motor M2 for effecting angular displacement of the housing 15 about an axis 20A perpendicular to the axis 10A. A transducer T2 arranged between the housings 15,20 is adapted for sensing the angle D2 of the displacement. The housing 20 is supported on a housing 30 by a motor Ms for effecting angular displacement about an axis 30A perpendicular to the axis 20A. A transducer T3 is arranged to be adapted for sensing the angle, D3, of the latter displacement. The axes 20A, 30A have a fixed relationship preferably such that they intersect at a common point I. The apparatus as described so far constitutes a probe head PH.

The probe head PH constitutes a structure or arm 17 having an end portion 17A secured to the member 40 nominally regarded as fixed and a free end portion 17B defined by the element 11. The arm 17 is also regarded as having a first portion 17C extending between the end portion 17A and the axis 20A, a second portion 17D extending between the axis 20A and the housing 15, and a third end portion defined by the stylus 10.

Figure 2:
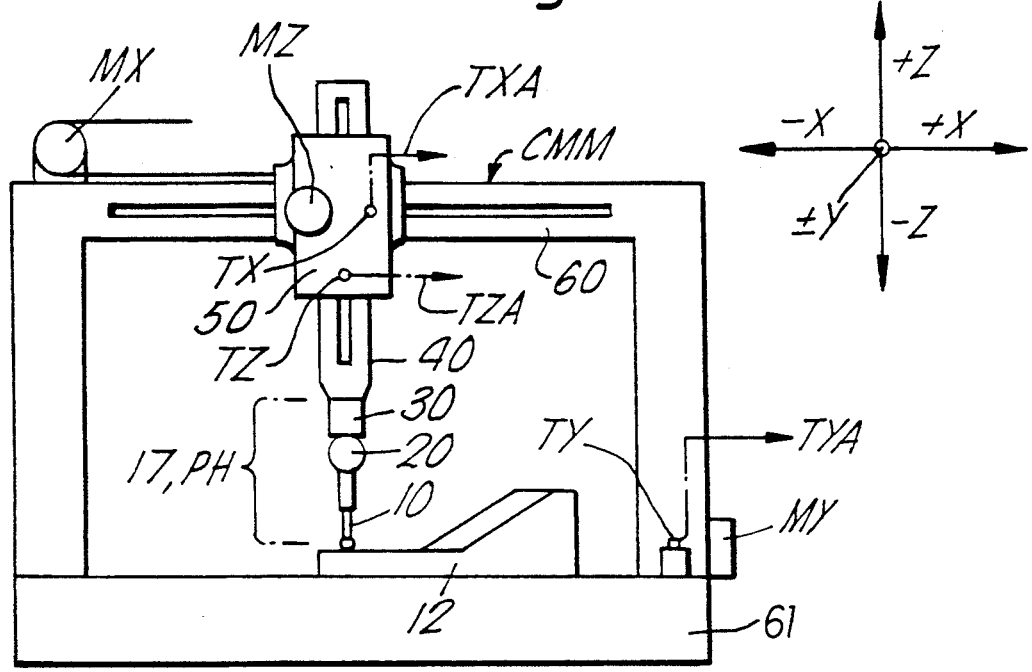
FIG. 2 is an elevation of a coordinate measuring machine embodying the probe head.

The probe head PH is intended for use with a coordinate measuring machine CMM (FIG. 2) having a member 40 supported on a member 50 for linear displacement in the direction of an axis Z, the member 50 being supported on a member 60 for linear displacement in the direction of an axis X, and the member 60 being supported on a base 61 for linear displacement in the direction of an axis Y. The axis X,Y,Z are mutually perpendicular. In use the probe head is connected to the machine CMM by the end portion 17A being secured to the member 40 preferably such that the axes 30A and Z have the same direction.

The members 40,50,60 are adapted to be driven in the directions X,Y,Z by motors MX,MY,MZ respectively and the instantaneous positions of the members 40,50,60 in the directions X,Y,Z are sensed by transducers TX,TY,TZ respectively whose outputs are denoted TXA,TYA,TZA.

The motors M2,M3 may be operated in a positioning mode for placing the element 11 into a pre-determined position or these motors may be operated in a torque mode for urging the element 11 into engagement with the workpiece with a predetermined force.

Figure 3:
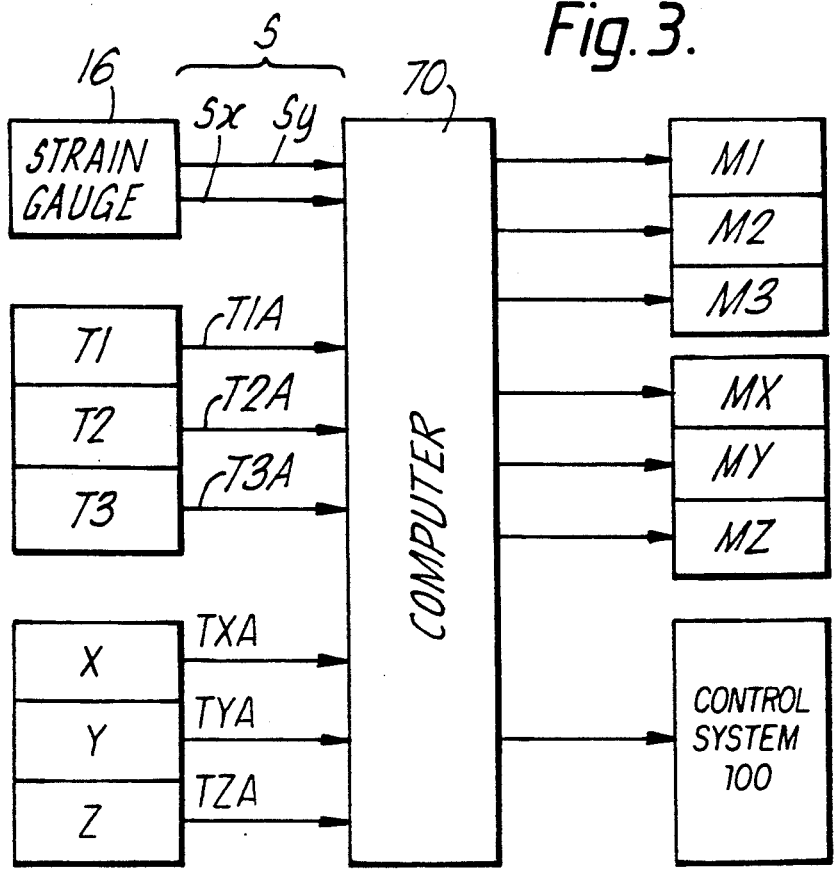
FIG. 3 is a system diagram showing a computer arranged for controlling electrical components of the machine and the probe head.
Figure 4:
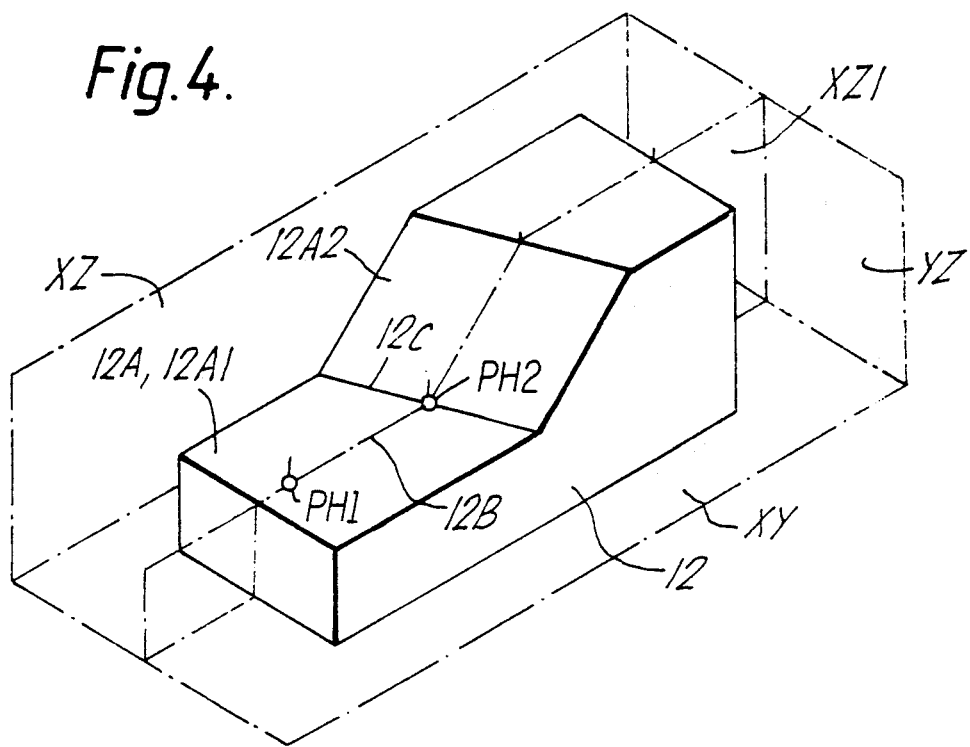
FIG. 4 is an perspective view of a workpiece whose contour is to be determined by the machine and probe head.
Figure 5:
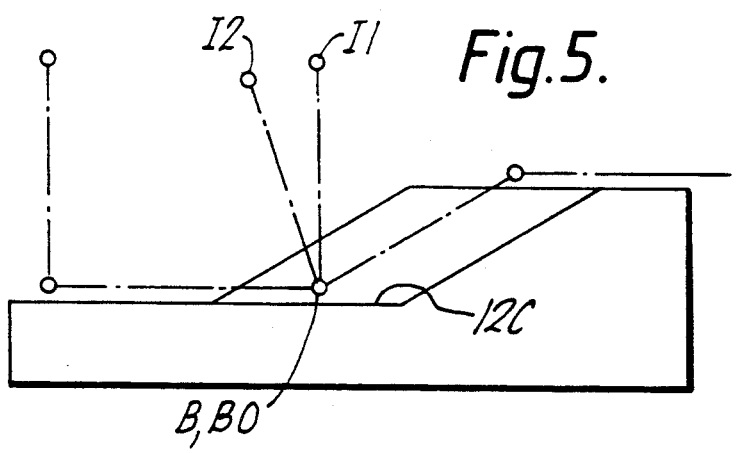
FIG. 5 is an elevation of the workpiece.

A computer 70 (FIG. 3) is programmed to operate the motors M(X,Y,Z,2,3), and if required also the motor M1, so as to place the element 11 in a given position in the coordinate field of the machine or to determine the coordinate position of a point on the workpiece or, by a scanning operation, determine the coordinate position of points along a profile of the workpiece.

The probe head PH is calibrated so as to have a datum condition from which any operational displacements of the motors M1,M2,M3 and any bending of the stylus due to the force F2 are measured. In the present example the datum condition is defined when the axes 10A,30A are aligned, the axis 20A extends in the Y direction and, while no force or only a preselected force acts on the element 11, a given distance R1 is defined between the points I,B. The distance R1 may be defined when the motor M1 is in a zero position approximately mid-way between the full extent of its possible movement D1.

It is to be understood that the position of the centre B is required to be known in terms of so-called "machine coordinates" which are measurements in the directions X,Y,Z relative to mutually perpendicular datum planes XY,XZ and YZ respectively. To this end, account is taken of the so-called "probe coordinates" which are the polar coordinates of the point B relative to the point I. To derive the machine coordinates of point B, the polar coordinates of the point B are converted into machine coordinates and added to the machine coordinates of the point I.

Referring to FIGS. 4 to 9 the workpiece 12 is shown (FIGS. 4,5,6) in relation to the datum planes XY,XZ,YZ. The surface 12A comprises a surface portion 12A1 parallel to the XY plane and a surface portion 12A2 lying oblique to each of the three datum planes. The mutual relationship of the surface portions 12A1,-12A2 is an example of a change in orientation of the surface 12A which may occur in practice. It is assumed by way of example that the machine CMM has to determine the profile of the workpiece in a plane (the "scanning plane") XZ1 parallel to the XZ datum plane, the profile itself being defined by a line 12B. The probe PH is shown in a first position PH1 in which the probe head is in the datum condition described hereinabove and which is also the start position for the scanning operation. A second position PH2 shows the probe head PH at the juncture 12C of the portions 12A1,12A2.

The scanning operation is intended to be such that the element 11 is moved along the line 12B and that the axis 10A remains substantially normal to the surface 12A regardless of the orientation thereof. The scanning operation is carried out with the aid of a control system 100 (FIG. 9), associated with the computer 70, and which acts on the relevant ones of the motors M(X,Y,Z,1,2,3) by control loops L1,L2,L3 and which responds to forces which act on the element 11 by its mechanical interaction indicated symbolically by lines 107,108,109 with the orientation of the surface 12A, indicated symbolically at 106, the interactions 107,108,109 produce the outputs T1A and Sx,y as shown in FIG. 9.

In the following description said forces are treated as vectors acting on the point B. The profile is determined in terms of positions of the point B along the line 12B in terms of machine coordinates. It is to be understood that those of the vectors which determine the position of the point B are converted into machine coordinates, this being well understood per se and not specifically described. The vectors, of which the vectors F1,F2 have already been briefly mentioned, are now described in detail, considering at first the position PH1 of the probe head.

The vector F1 is generated by the pressure of the motor M1 and is sensed by the output, T1A, of the transducer T1 which responds to the axial positions of the stylus. As will be seen the vector F1 is maintained at a given nominal value by control of the position of the point I the motors M(X,Y,Z).

The vector F2 is the reaction of the surface 12A in a direction normal to the axis 10A and is produced by a computation 101 from the output of the system 16, i.e. from a component signal Sx normal to the axis 20A and a component signal Sy parallel to the axis 20A. For so long as the vector F1 is normal to the surface 12A, the vector F2 is of course zero.

A vector F3 defines the orientation of the surface 12A at the point B or the reaction of the surface 12A normal thereto. The vector F3 is computed by an operation 102 (FIG. 9) from the vectors F1,F2. In the position PH1, the vector F3 is simply the equal and opposite of the vector F1.

A vector F4 lies at right angles to the vector F3 and is computed by an operation 103 from the vector F3 by a "vector turning" computation. Thus the vector F4 also defines the orientation of the surface 12A but the actual direction of the line 12B on the surface 12A is not yet known.

The direction of the line 12B is given by the cross-product of the vector F4 and a vector F5 normal to the scanning plane XZ1. The vector F5 is simply a constant position demand, in this example on the motor MY. The cross-product is produced by a computation 104 whose output is a vector F6 defining the direction of the line 12B.

A speed term S7 is applied to the direction F6 by an operation 105 to produce a vector F7 which now defines both the speed and the required direction of the element 11 to follow the surface 12A along the line 12B.

When the element 11 reaches the junction 12C the interactions 106,107 affect the vectors F1,F2 as follows. Regarding the vector F1, since in the present example the interaction 107 urges the stylus toward the housing 15, the motor M1 is displaced from its nominal position and produces a change in the output T1A of the transducer T1, i.e. a change in the magnitude of the vector F1. Thus the motor M1 cushions the stylus against damage, but to restore the motor M1 as quickly as possible to its nominal position, and further to avoid damage to the stylus 10, the vector F1 is connected by the loop L1, which is relatively fast, to the motors M(X,Z) thereby raising the probe head relative to the surface 12A.

Regarding the vector F2, the interaction 108 produces a change in the signals Sx,y and a new value for the vector F2. The resulting change in the vector F3, i.e. the vector defining surface orientation, is communicated by the relatively slower loop L2 to the motors M(2,3) so as to rotate the arm 17 about the axes 20A,30A in the sense of bringing the axis 10A into the direction of the vector F3, i.e. to a position normal to the portion 12A2.

Figure 6:
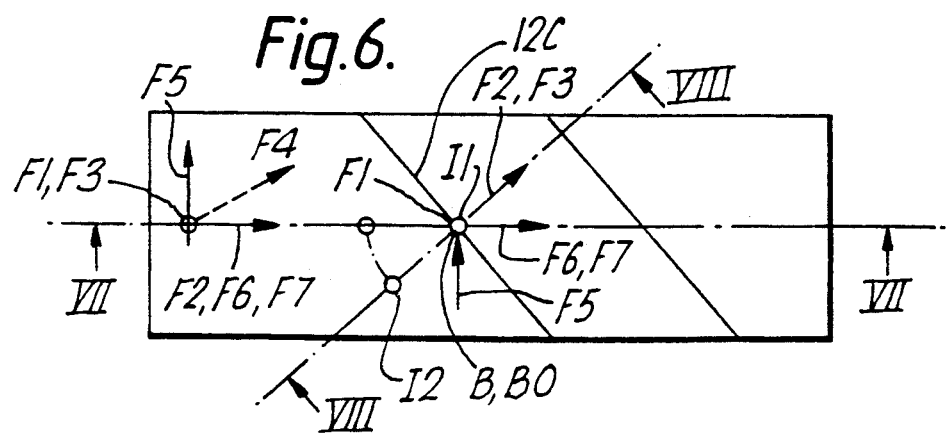
FIG. 6 is a plan view of FIG. 5.

This change in the angular orientation of the probe head PH has two effects. Firstly, the mechanical interaction 109 between the stylus and the surface 12A2 may result in a change in the distance I,B. This is compensated for by the loop L1. Secondly, since the change in the angular orientation of the probe head tends to shift the position of the point B away from the location, BO, which it has on the plane XZ1, this tendency needs to be compensated for by a shift in the position of the point I such that the point B remains at the location BO. The required displacement of the point I has to take place in the X,Y,Z demensions from a position I1 to a position I2 (FIG. 6 to 8). This is effected by the loop L3 whereby the vector F3 is connected, through a summing junction 110, to the motors M(XYZ). It will be clear that the displacement of point I may be due to the loop L1 or the loop L3 whichever loop demands the greater displacement.

Figure 10:
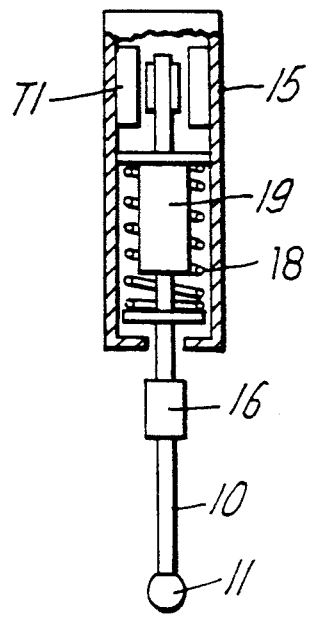
FIG. 10 is a detail of FIG. 1 and shows a modification of a motor shown in FIG. 1.

Referring to FIG. 10, instead of the electromagnetic motor M1, there may be provided a motor constituted by a spring 18 which urges the stylus in a direction away from the housing 15. Instead of the springs 13,14 the stylus 10 may be supported for its axial motion by a precision linear bearing 19.

Figure 11:
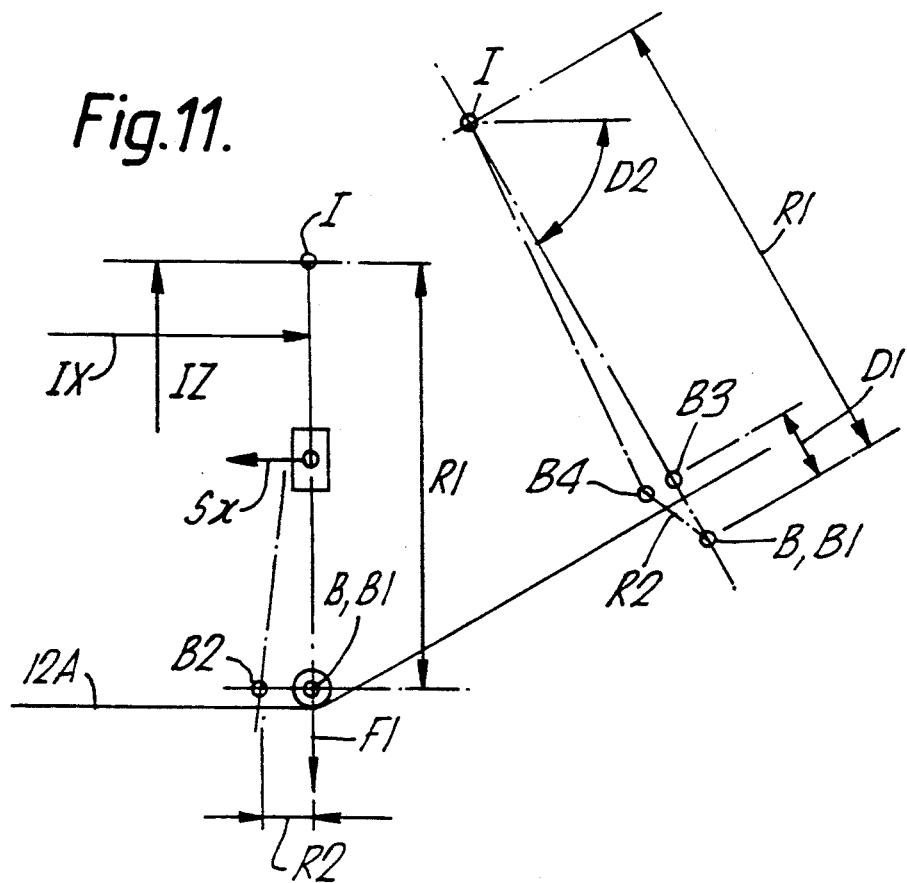
FIG. 11 is a view similar to FIG. 5 and diagrammatically illustrates deflection of the probe head.

As has been explained, the system 16 may be used for determining the vector F2 with a view to deriving the vector F3. However, the system 16 may, in any case, be used for measuring deflection of the arm 17 with a view to correcting the position measurement of the transducers TX,TY,TZ insofar as that measurement is falsified by deflection of the arm 17. Referring to FIG. 11, the stylus is assumed to be deflected such that the point B is moved from a nominal position B1 which it has when no force other than the vector F1 acts thereon, to a deflected position B2. This may occur due to friction between the element 11 and the surface 12A or due to engagement with surface portion 12A2. The extent of the deflection which, in this example, takes place solely in the X direction, is denoted R2 and is computable by the expression $R2 = Sx/Kx$ where Sx is the output of the system 16 in the XZ plane perpendicular to the axis 10A and Kx is the spring constant of the stylus in the same direction. A position B2X of the point B in machine coordinates is then $B2X = IX - Sx/Kx$ where IX is the position, in machine coordinates, of the point I. However, if one considers obliqueness of the surface 12A to the XY plane and an angular displacement D2 of the motor M2, and further considers a linear displacement D1, all as shown by the positions B1,B3,B4, then the X and Z positions of the point B are given by:

$$B4X = IX + R1 \cos D2 + R2 \sin D2 \text{ and}$$

$$B4Z = IZ + R1 \sin D2 + R2 \cos D2.$$

wherein:
IX = the position of the point I in the X direction.
IZ = the position of the point I in the Z direction.
R1 = the distance between the points I,B.
R2 = the distance between the positions B1,B4.
D2 = the angle of displacement of the motor M2.

It will be clear that inasmuch as the surface 12A is oblique both to the XY and the YZ plane, the angle D3 of the motor M3 has to be taken account of also.

The system 16 may be provided at any location along the length of the arm, e.g. at a connection 21 (FIG. 1) between the motor M3 and the housing 20.

Systems such as the system 16 are known per se e.g. from U.S. Pat. No. 4,158,919 (McMurtry) or from Federal Republic of Germany OLS No. 1,638.048 (Indramat).

An arrangement of motors such as the motors M2,M3 is shown in detail in our co-pending International Application No. PCT/GB88/01135 (applicant's Ref. 100WO).

We claim:

1. A support structure for an elongate surface-sensing stylus for use in a position determining apparatus, the stylus having a sensing element for engaging a surface at a free end, the support structure comprising:
   a housing having an axis;
   a pair of planar springs provided within the housing for supporting the stylus, each spring extending in a plane transverse to said axis and the springs being spaced apart along said axis;
   the stylus being directly connected to each of the springs, and extending substantially parallel to said axis, the springs thereby supporting the stylus in said housing for linear displacement in a direction parallel to said axis, wherein the free end of the stylus projects out of the housing thereby to enable the sensing element to engage a surface;
   strain sensing means for sensing strain in the stylus as a result of force acting on the sensing element in a direction transverse to said axis;
   measuring means for measuring said linear displacement of said stylus; and
   computer means operatively coupled to the strain sensing means and measuring means for determining the position of the surface using the strain sensed by the strain sensing means and the linear displacement measured by the measuring means.

2. A support structure according to claim 1, further comprising bias means for urging the stylus longitudinally in a sense away from the housing.

3. A support structure for an elongate surface-sensing stylus for use in a position determining apparatus, the stylus having a sensing element for engaging a surface at a free end, the support structure comprising:
   a housing having an axis;
   support means for supporting the stylus for linear motion only along the direction of the length of the stylus and substantially parallel to said axis;
   strain sensing means for sensing strain in the stylus as a result of force acting on the sensing element in a direction substantially transverse to said axis;
   measuring means for measuring linear displacement of said stylus in a direction parallel to said axis; and
   computer means operatively coupled to the strain sensing means and measuring means for determining the position of the surface using the strain sensed by the strain sensing means and the linear displacement measured by the measuring means.

4. A coordinate positioning machine comprising a member movable in three dimensions relative to a table, and transducing means for measuring displacement of the member in each of three mutually orthogonal directions, the member supporting a support structure for an elongate surface sensing stylus having a sensing element for engaging a surface at a free end, the support structure comprising:

a housing having an axis;

a pair of planar springs provided within the housing for supporting the stylus, each spring extending in a plane transverse to said axis and the springs being spaced apart along said axis;

the stylus being directly connected to each of the springs, and extending substantially parallel to said axis, the springs thereby supporting the stylus in said housing for linear displacement parallel to said axis, wherein the free end of the stylus projects out of the housing thereby to enable the sensing element to engage a surface;

strain sensing means for sensing strain in the stylus as a result of force acting on the sensing element in a direction transverse to said axis;

measuring means for measuring said linear displacement of said stylus; and computer means operatively coupled to the strain sensing means and measuring means for determining the position of the surface using the strain sensed by the strain sensing means and the linear displacement measured by the measuring means.

5. A coordinate positioning machine according to claim 4 further comprising a probe head for orienting said support structure relative to said member about first and second mutually perpendicular axes.

* * * * *